United States Patent [19]

Brolin

[11] 4,245,294

[45] Jan. 13, 1981

[54] POWER SUPPLY PROVIDING CONSTANT POWER OUTPUT

[75] Inventor: Stephen J. Brolin, Livingston, N.J.

[73] Assignee: Bell Telephone Laboratories, Incorporated, Murray Hill, N.J.

[21] Appl. No.: 974,377

[22] Filed: Dec. 29, 1978

[51] Int. Cl.³ .................................................. H02M 7/06
[52] U.S. Cl. ......................................... 363/126; 324/119
[58] Field of Search .................... 179/2 BC; 307/321; 324/119; 328/26; 363/125, 126

[56] References Cited

U.S. PATENT DOCUMENTS

| 3,001,120 | 9/1961 | Bereskin | 363/126 |
|---|---|---|---|
| 3,286,185 | 11/1966 | Gilbert | 307/321 X |
| 3,304,440 | 2/1967 | Sillers, Jr. | 323/DIG. 1 |
| 4,045,722 | 8/1977 | Tachibana | 363/126 |
| 4,131,939 | 12/1978 | Day | 363/126 |

OTHER PUBLICATIONS

Electric Design 24₂ "Capacitor Drops Voltage with Little Heat for Low-Cost, Low Voltage Power Supply," D. Thom., Nov. 22, 1975, p. 148.
IEEE Trans. on Industrial Electronics & Control Instrumentation, "Constant Voltage, Current, and Power: A Circuit for all Reasons," D. A. Pace, vol. 1EC1-25, #1, Feb. 1978, pp. 55-58.

Primary Examiner—William M. Shoop
Attorney, Agent, or Firm—Robert O. Nimtz

[57] ABSTRACT

A power supply for developing substantially constant average power in a variable resistance load (18) from an alternating polarity source (11) comprises an AC portion including serially connected capacitor means (12), and a DC portion including rectifying means (20) for providing a polarized signal to load resistance (18) and inductor means (17) for maintaining a charging current through a path including capacitor means (12). The constant average power mode obtains when the range of values of load resistance (18) is less than a network parameter determined from the frequency of source (11) and value of capacitor means (12).

7 Claims, 5 Drawing Figures

POWER SUPPLY PROVIDING CONSTANT POWER OUTPUT

BACKGROUND OF THE INVENTION

1. Field of the Invention

This invention relates generally to power supplies and, more specifically, to DC supplies that provide constant power to a resistive load over a broad range of resistance values.

2. Description of the Prior Art

In telephone system applications, particularly those relating to analog or digital carrier systems operating over subscriber loops, a major design consideration is one of limiting power dissipation. Generally, a subscriber loop carrier system must supply DC current to the telephone equipment which it serves. Dissipation becomes a significant concern in a system wherein many loops are powered within a small volume, such as a field-located cabinet. In addition, dissipation increases reserve battery capacity requirements and cost. Therefore a nondissipative DC power supply that provides constant average power into a variable resistance load allows for effective power load planning and equipment design.

Many prior art supplies employ dissipative and, oftentimes, complex circuitry, including active components, to achieve the desired regulated output power over the anticipated range of load resistances. The cost of such an arrangement is an important factor in the overall cost of the system and thus affects the prove-in point of the system. Moreover, because of the remote location and harsh operating environment of the cabinet, maintenance and reliability also present problems. A supply developed from circuitry utilizing passive elements offers reduced cost and maintenance and improved reliability.

The article entitled "Constant Voltage, Current, and Power: A Circuit for All Reasons," by D. A. Paice, *IEEE Transactions on Industrial Electronics and Control Instrumentation*, February 1978, is representative of prior art power supplies that employ an alternating polarity source and passive elements, including rectifying means, to derive a DC supply. The article discloses circuit arrangements and corresponding component values for obtaining a relatively constant power output over a range of load resistance values. However, the range is somewhat limited since, for example, only a three octave change in resistance values about a preselected operating point results in ±35 percent power variations. Furthermore, the "constant" power mode is established by tuning an inductor and capacitor pair to the frequency of a sinusoidal input source so operation is sensitive to component variations of this pair.

SUMMARY OF THE INVENTION

In accordance with the illustrative embodiment of the present invention, an improved DC source provides constant power to a variable resistance load. The source comprises: an AC portion including an alternating polarity source, including such sources as a pulse source or a square-wave voltage source, feeding a serially connected capacitor; and a DC portion including rectifier means serially connected to the capacitor and an inductor interposed between the rectifier means and the load resistance.

Constant power is delivered to the load whenever the load resistance does not exceed a parameter fixed by the capacitor value and the repetition rate of the source. Since the capacitor charges to full voltage before the end of a half-period of the source and the output voltage varies directly with charging time whereas the output current varies inversely with respect to charging time, the product of voltage and current remains constant.

A particularly novel feature of the DC power supply implemented in accordance with the present invention is that, although the source is alternating in polarity at a nominal repetition rate and an inductor and capacitor pair control circuit operation, the supply is essentially insensitive to repetition rate changes and component variations. Since the principle of operation does not rely on resonance of the pair, the component values and repetition rate are chosen so that all reasonably anticipated variations do not affect circuit performance.

These and other objects, features and advantages will be apparent hereinafter from a detailed disclosure of the invention relative to the attached drawing.

DETAILED DESCRIPTION

Figure 1:
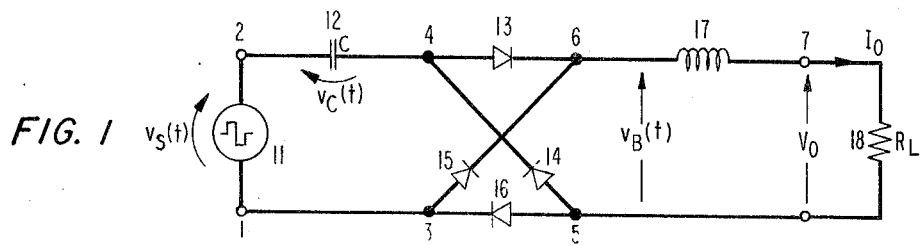
FIG. 1 is a schematic circuit diagram of one embodiment of the present invention in which a square-wave source supplies AC voltage for conversion to DC.

With reference to FIG. 1, an illustrative embodiment of the present invention is shown as one wherein an alternating polarity, square-wave source 11 is connected across input terminals 1 and 2. Capacitor 12 is serially connected between terminals 2 and 4. Four diodes 13, 14, 15, and 16 form bridge rectifier 20. The anode of diode 13 is connected to terminal 4 and the cathode of diode 13 is connected to terminal 6. Diode 14 has its anode connected to terminal 5 and its cathode to terminal 4. Diode 15 is connected between terminals 3 and 6, with the anode connected to terminal 3. Diode 16 is connected between terminals 3 and 5, with the cathode connected to terminal 3. Inductor 17 is serially connected between terminals 6 and 7. Load 18, which is illustrated as a resistor but may be, for example, the combined DC resistance of a subscriber loop and associated telephone set, is connected between terminals 5 and 7.

To facilitate further description, the voltage and power characteristics exhibited by the embodiment of FIG. 1 are presented first so as to lead to a better understanding of the operational description which subsequently follows.

1. Characteristics

Only the characteristics of the circuit of FIG. 1 in steady-state require elucidation. Steady-state performance is of primary interest since transient effects dissipate rapidly and therefore do not significantly affect overall circuit performance.

To assist in the description, certain parameters of both individual circuit elements and of the overall circuit are now defined. Square-wave source 11 is symmetric and operates at a repetition frequency designated by f. Capacitor 12 has a value designated by C. Using both C and f, a network parameter, called the critical resistance and designated by $R_F$, is determined from the relation $R_F = 1/(4Cf)$.

Two distinct modes of operation (to be described shortly) exhibiting characteristics determined by the particular value of load resistance 18, designated by $R_L$, may be identified. The first mode produces a constant average output voltage supplied to load resistance 18 whenever $R_L$ is greater than $R_F$. In this mode, power output is inversely proportional to $R_L$. The second mode exhibits constant average power delivered to load resistance 18, and this occurs for values of $R_L$ less than $R_F$. In this mode, as $R_L$ decreases from its maximum value of $R_F$, the load current increases whereas the load voltage decreases inversely with respect to the current. The current-voltage product therefore remains constant.

Figure 2:
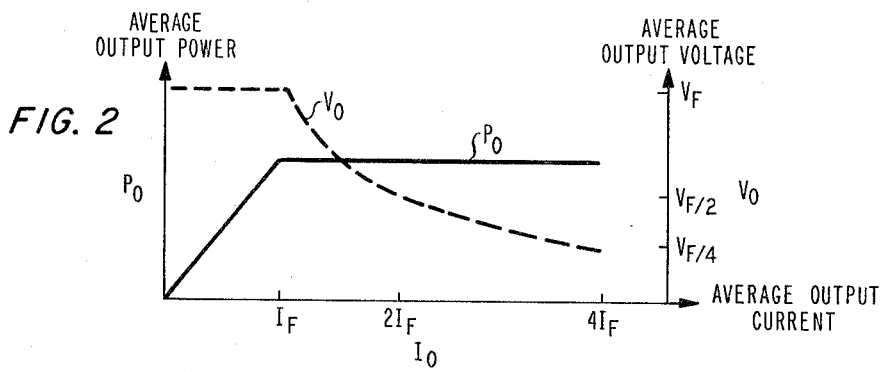
FIG. 2 graphically depicts the characteristics of both the average output power and average load voltage versus average output current for the circuit of FIG. 1.

Both the average output power ($P_O$) versus average output current ($I_O$) and the average output voltage ($V_O$) versus average output current characteristics of the two modes of operation are graphically depicted in FIG. 2. FIG. 1 shows that $V_O$ is measured at terminal 7 relative to terminal 5 as $I_O$ flows from terminal 7 to 5. $P_O$ is the average power dissipated in resistance 18. The mode characterized by constant average output voltage and associated variable output power delivered to load $R_L$ is exhibited for output current values between O and a current designated $I_F$. The constant power and corresponding variable voltage mode exist for all output current values greater than $I_F$. In this mode, the proportionality relation between the voltage and current is displayed. If $V_F$ designates the constant voltage resulting from mode one operation, then, for example: an output current of $2I_F$ yields an output voltage of $V_F/2$; a current of $4I_F$ results in a voltage of $V_F/4$; and so forth. The constant power in this second mode is given by the product $V_F I_F$. The relations among $R_F$, $I_F$, and $V_F$ will be developed in the operational description that follows.

For a given circuit application, operation in the constant power mode requires an estimate of the highest anticipated value of load resistance which, in turn, defines the critical resistance. Appropriate values for capacitor value C and repetition rate f are then chosen to satisfy the critical resistance requirement and meet minimum output current requirement at this maximum resistance.

2. Operation

Figure 3:
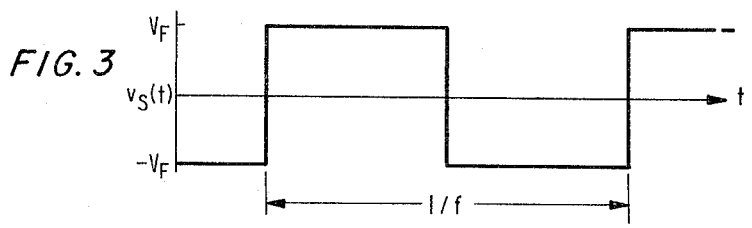
FIGS. 3, 4, and 5 display the instantaneous, steady-state voltages across the square-wave source, across the capacitor, and at the output of the bridge circuit, respectively, of the circuit shown in FIG. 1 for three specific values of load resistance $R_L$.
Figure 4:
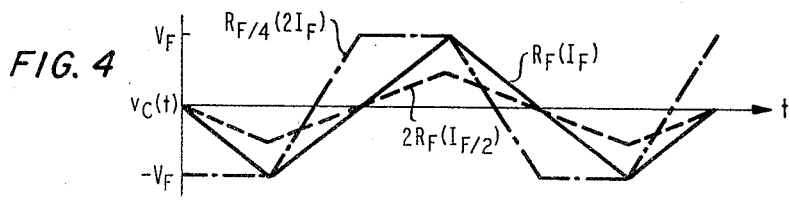
Figure 5:
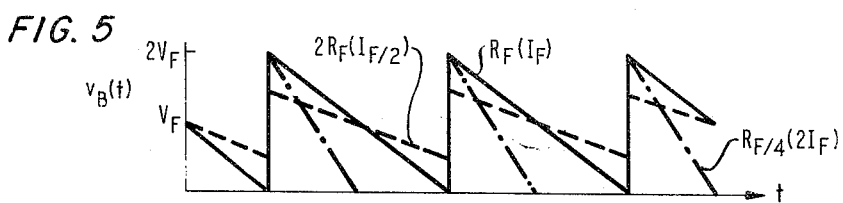

FIGS. 3, 4 and 5 show voltage waveforms that are useful in describing circuit operation. The square-wave generated by source 11 is given in FIG. 3. FIG. 4 shows the instantaneous steady-state voltage across capacitor 12 (terminal 2 relative to 4 in FIG. 1), whereas FIG. 5 depicts the instantaneous steady-state voltage across the output of bridge 20 (terminal 6 relative to 5 in FIG. 1). The waveforms shown in both FIG. 4 and FIG. 5 are dependent on load resistance 18 and curves for three specific values of $R_L$ are plotted to facilitate description.

The first mode of operation, which exhibits constant average output voltage, occurs whenever $R_L$ is greater than $R_F$. As depicted in FIG. 5, the voltage output from bridge 20 varies linearly and equally about the voltage $V_F$ level supplied by source 11. Thus the average voltage into inductor 17, which functions primarily as a low-frequency filter in this mode, is $V_F$, independent of the value of $R_L$. In fact, for the given range of $R_L$, the average output voltage from bridge 20 and hence the average voltage across load 18, is not sensitive to the particular value of capacitor 12. This mode obtains because capacitor 12 is not able to charge to full value in a half-cycle, as depicted in FIG. 4 for $R_L = 2R_F$.

The second mode of operation exhibits constant average output power whenever $R_L$ is less than $R_F$. In this mode, the interaction between capacitor 12 and inductor 17, which now serves primarily as a current source, is such that capacitor 12 charges linearly to the maximum possible voltage prior to the end of each half-cycle. This is depicted in FIG. 4 for $R_L = R_F/4$. The average voltage supplied by bridge 20 decreases as $R_L$ decreases. This voltage fall-off effect is depicted in FIG. 5 for $R_L = R_F/4$ wherein it is observed the average voltage is less than $V_F$.

The transition between modes of operation occurs for $R_L = R_F$, as witnessed with reference to FIGS. 4 and 5. For $R_L = R_F$, capacitor 12 just charges to the maximum or minimum possible voltage $V_F$ or $-V_F$, respectively, at the end of each half-cycle. The capacitor charges linearly between $-V_F$ and $V_F$ (or $V_F$ and $-V_F$), so from basic circuit considerations relating accumulated charge to capacitor value and voltage, $$I_F/2f = 2CV_F, \tag{1}$$

where $I_F$ is the average output current maintained by inductor 17 for $R_L = R_F$. The critical resistance parameter $R_F$ is defined by the ratio of average output voltage to average output current at the transition boundary, that is, $R_F = V_F/I_F$, so from equation (1), $$R_F = 1/(4Cf). \tag{2}$$

For values of $R_L$ less than $R_F$, the average output current increases as $R_L$ decreases. Since the average output current is designated by $I_O$, then for $R_L$ less than $R_F$, $$I_O = I_F/\alpha \tag{3}$$

where $0 < \alpha < 1$. The parameter $\alpha$ is a duty factor and represents the ratio of capacitor 12 charging time to the half-cycle time of source 11. Thus current conduction through capacitor 12 occurs with a duty factor of $\alpha$. Furthermore, the average output voltage decreases and is determined by the percentage of time that capacitor 12 conducts, so the average output voltage is given by $$V_O = \alpha V_F. \tag{4}$$

Finally, from equations (3) and (4), $$R_L = \frac{V_O}{I_O} = \frac{\alpha V_F}{(I_F/\alpha)} = \alpha^2 R_F \tag{5}$$

and the average output power is given by $$P_O = V_O I_O = V_F I_F = (V_F^2/R_F). \tag{6}$$

3. Example

As a practical example in telephony applications, a typical design requirement is that of supplying at least 24 ma to customer telephones, so $I_F = 24$ ma. Moreover, if the square-wave source is derived by switching the 48 V DC source typically supplied by the central office battery, then $V_F = 48$ V. Thus, $$R_F = V_F/I_F = 2000 \text{ ohms},$$

and from equation (6), $$P_O = 1.152 \text{ watts}.$$

If one particular customer is served on a loop having, say, a total resistance of $R_L = 500$ ohms, then from equation (5), $\alpha^2 = 0.25$ and $\alpha = 0.5$. Therefore, the average output voltage and current delivered to $R_L$ are $$V_O = (0.5)(48) = 24 \ V$$

and $$I_O = 24/(0.5) = 48 \text{ ma},$$

while the power remains constant at 1.152 watts. Moreover, for all values of $R_L$ up to and including 2000 ohms, constant power of 1.152 watts obtains.

It will be further understood that the power source herein described is not limited to specific forms disclosed by way of example and illustration, but may assume other embodiments limited only by the scope of the appended claims.

I claim:

1. A power supply of the type comprising an alternating polarity source feeding a combination of rectifier means and inductor means serially connected between said rectifier means and a load resistance, characterized by
    capacitor means interposed in series relation between said source and said rectifier,
    wherein the power dissipated in said load resistance is constant for resistance values below $1/(4fC)$, f being the frequency of said source and C being the capacitance of said capacitor.

2. The power supply as recited in claim 1 wherein said alternating polarity source comprises a square-wave voltage generator and said capacitor means charges linearly to the full voltage of said generator for values of said load resistance, up to said value $1/(4fC)$.

3. A power supply for deriving from nonsinusoidal, alternating polarity generator means a constant average power in a load resistance comprising:
    storage means serially connected to said generator means for accumulating charge,
    converter means serially connected to said storage means for developing a unidirectional charging current, and
    means serially connected between said converter means and said load for maintaining said charging current through a path including said load,
    wherein the power dissipated in said load is constant for load values less than $1/(4fC)$, f being the frequency of said generator means and C being the capacitance of said means for accumulating charge.

4. The power supply as recited in claim 3 wherein said generating means comprises a square-wave source,
    said storage means includes a capacitor,
    said converter means comprises rectifying means, and
    said maintaining means includes an inductor.

5. A power supply to control power delivered to a load resistance having a value $R_L$ characterized by:
    means for generating a dual-polarity, square-wave signal of amplitude $V_F$ and repetition frequency f,
    capacitor means having a value C serially connected to said generating means, said capacitor value and said frequency determining a critical resistance $R_F = 1/(4fC)$,
    full-wave rectifying means serially connected to said capacitor means for providing a polarized voltage to said load, and
    inductor means serially connected between said rectifying means and said load for maintaining a charging current to said capacitor means through at least said load,
    said supply being arranged so that the average power delivered to said load is constant and substantially equal to $V_F^2/R_F$ for each positive value of said $R_L$ less than said $R_F$.

6. Apparatus to control power dissipation in a two-terminal, variable load resistance having value $R_L$ as supplied from a source comprising a two-terminal, symmetric square-wave generator having positive and negative voltage levels of amplitude $V_F$ and period $1/f$, comprising:
    first, second, third, and fourth rectifying diodes connected in a full-wave rectifying bridge configuration and defining a pair of input terminals and a pair of output terminals, said bridge converting bipolar voltage present at said input terminals to unipolar voltage at said output terminals for providing a polarized voltage having average value $V_O$ across said load,
    a capacitor having a value C and serially connected between said source and said input terminals, said capacitor and said period determining a resistance parameter $R_F = 1/(4fC)$, and
    an inductor serially connected between said output terminals and said load terminals for maintaining a substantially constant, unidirectional charging current having value $I_O$ through said load,
    wherein for $0 < R_L \leq R_F$, said charging current fully charges said capacitor before said square-wave generator changes polarity so that constant power of $V_F^2/R_F$ is delivered to said load and $V_O = \alpha V_F$ for $R_L = \alpha^2 R_F$, $0 < \alpha < 1$, where $\alpha$ represents the ratio of charging time of said capacitor to $1/(2f)$.

7. A power-limited direct current supply circuit comprising
    a pulse source,
    a resistive load, and
    a capacitor, a rectifier and an inductor serially connected in order between said source and said load,
    wherein the power dissipated in said load is constant for load values below $1/(4fC)$, f being the frequency of said source and C being the capacitance of said capacitor.

* * * * *

UNITED STATES PATENT AND TRADEMARK OFFICE
CERTIFICATE OF CORRECTION

PATENT NO. : 4,245,294
DATED : January 13, 1981
INVENTOR(S) : Stephen J. Brolin

It is certified that error appears in the above-identified patent and that said Letters Patent are hereby corrected as shown below:

Column 4, line 62, that portion of the formula reading "$(V_F^2 I/R_F)$" should read --$(V_F^2/R_F)$--.

Signed and Sealed this

Nineteenth Day of May 1981

[SEAL]

Attest:

RENE D. TEGTMEYER

Attesting Officer

Acting Commissioner of Patents and Trademarks